United States Patent

Kagawa

[11] Patent Number: 5,116,561
[45] Date of Patent: May 26, 1992

[54] METHOD OF PREPARING A COMPOSITE MATERIAL IN THE FORM OF ULTRA-FINE PARTICLES

[75] Inventor: Seiji Kagawa, Yokohama, Japan

[73] Assignee: Atsuko Kagawa, Yokohama, Japan

[21] Appl. No.: 752,211

[22] Filed: Aug. 21, 1991

Related U.S. Application Data

[63] Continuation of Ser. No. 559,997, Jul. 31, 1990, abandoned, which is a continuation of Ser. No. 332,995, Apr. 4, 1989, abandoned.

[30] Foreign Application Priority Data

Dec. 28, 1988 [JP] Japan .................. 63-328888

[51] Int. Cl.⁵ ................................. B29B 9/08
[52] U.S. Cl. ........................ 264/115; 264/117; 264/118; 264/122; 264/123; 264/120
[58] Field of Search ............... 264/60, 109, 112, 114, 264/115, 117, 118, 121, 122, 123, 125, 120

[56] References Cited

U.S. PATENT DOCUMENTS

| | | | |
|---|---|---|---|
| 1,555,978 | 10/1925 | Hunt | 264/122 |
| 2,849,414 | 8/1958 | Stott | 264/122 |
| 3,368,004 | 2/1968 | Sirianni et al. | 264/117 |
| 3,447,962 | 6/1969 | Negowan | 264/117 |
| 4,117,065 | 9/1978 | Tsien et al. | 264/121 |
| 4,255,374 | 3/1981 | Lemcke et al. | 264/122 |
| 4,308,073 | 12/1981 | Mills | 264/117 |
| 4,439,385 | 3/1984 | Kuhls et al. | 264/117 |

FOREIGN PATENT DOCUMENTS

| | | | |
|---|---|---|---|
| 212714 | 3/1987 | European Pat. Off. | 264/117 |
| 62-242506 | 10/1987 | Japan | 264/117 |
| 63-209743 | 8/1988 | Japan | 264/117 |

*Primary Examiner*—Jeffery Thurlow
*Assistant Examiner*—Mathieu Vargot
*Attorney, Agent, or Firm*—Nixon & Vanderhye

[57] ABSTRACT

A method of preparing a composite material in the form of ultra fine particles which is mainly composed of organic polymers and has improved physical properties that cannot be obtained for organic polymers of one kind. This method includes a step of providing a dispersion in which organic polymer particles of at least two kinds, having different physical properties are dispersed in a dispersion medium, and an impingement and crushing step of causing the organic polymers dispersed in said dispersion to impinge with each other at high speed is repeated at least twice in order to crush each organic polymer and to combine, or fuse, the organic polymers simultaneously.

8 Claims, 2 Drawing Sheets

METHOD OF PREPARING A COMPOSITE MATERIAL IN THE FORM OF ULTRA-FINE PARTICLES

This is a continuation of U.S. application Ser. No. 07/559,997, filed Jul. 31, 1990, which is a continuation of U.S. application Ser. No. 07/332,995, filed Apr. 4, 1989, both now abandoned.

BACKGROUND OF THE INVENTION

1. Field of the Invention

This invention relates to a method of preparing composite materials in the form of ultra fine particles which mainly comprise organic polymers and have improved physical properties that cannot be obtained from a single

2. Description of the Related Art

Recently, various methods have been tried to improve the physical properties of organic polymers. One method is to form a composite material from organic polymers having different physical properties. The composite material made from organic polymers having different physical properties has improved physical properties that cannot be expected of polymers of one kind, as well as physical properties of each organic polymer from which the new composite is made.

Chemical methods and physical methods are utilized to form a composite from organic polymers. Chemical methods which can be used include block-copolymerization and graft-copolymerization, both of which change the molecular structure of polymers. Physical methods include a blend method which blends other organic polymers with the organic polymer whose physical properties are intended to change.

However, with these methods it is difficult to uniformly combine or conjugate different organic polymers.

On the other hand, it is reported that by making inorganic substances into ultra fine particles whose diameter is at most submicron order, specific properties appear which cannot be obtained for the substances in bulk form. Therefore, making organic substances into ultra fine particles is also expected to show the same effects as ultra fine particles of inorganic substances. To form fine powders of organic substances, grinding method, freeze-drying method, emulsion polymerization method and others can be used. Gas evaporation methods of forming ultra fine particles of organic substances are also disclosed in H. Toyotama and M. Oda "Powder and Industry", Vol. 20, No. 9, 1988. The gas evaporation method comprises the steps of: heating organic substances in inert gas atmosphere, which are intended for fine particles; and cooling the molecules of the organic substances thus evaporated by impinging them against inert gas molecules near an evaporation source to form fine particles.

However, no reports have been made of the preparation of ultra fine particles of composite materials from organic polymers and other materials.

SUMMARY OF THE INVENTION

An object of the present invention is to provide a method of preparing composite materials in the form of ultra fine particles having improved physical properties that cannot be obtained from organic polymers of one kind.

Another object of the present invention is to provide a method of preparing composite materials in the form of ultra fine particles of inorganic compounds and/or metals, which are uniformly dispersed in organic polymer matrixes and which have improved physical properties.

A method of preparing composite materials in the form of ultra fine particles, according to the present invention, comprises the steps of:

dispersing organic polymers of at least two kinds, and having different physical properties, in a dispersion medium to prepare a dispersion, and causing the organic polymer particles dispersed in said dispersion to impinge against with one another at high speed at least twice, thereby to crush and combine, or fuse, the organic polymers simultaneously.

Also, according to the present invention, there is provided a method of preparing composite materials in the form of ultra fine particles made of organic polymers and inorganic compounds and/or metals, said method comprises the steps of:

dispersing at least one type of organic polymers in a dispersion medium to prepare a first dispersion, causing the organic polymers dispersed in the first dispersion to impinge against one another at high speed at least twice, thereby to crush each organic polymer and to combine or fuse the organic polymers simultaneously, dispersing the inorganic compound particles or the metal particles, or both, in the composite material in the form of ultra fine particles obtained by the step of causing the organic polymers to impinge, thereby to prepare a second dispersion, and causing the particles dispersed in said second dispersion to impinge against one another at high speed at least twice, thereby to crush each organic polymer and combine, or fuse, the organic polymers simultaneously.

The present invention provides a composite material in the form of ultra fine particles comprising at least two kinds of organic polymers which are combined, or fused, and having mean diameter of less than 0.1 μm. The present invention also provides a composite material in the form of ultra fine particles comprising at least one of organic polymers, inorganic compounds, and/or metals which are combined, or fused, and having mean diameter of less than 0.1 μm.

Composite materials in the form of ultra fine particles prepared by the present invention can form films having improved properties.

BRIEF DESCRIPTION OF THE PREFERRED EMBODIMENTS

DETAILED DESCRIPTION OF THE PREFERRED EMBODIMENTS

Figure 1:
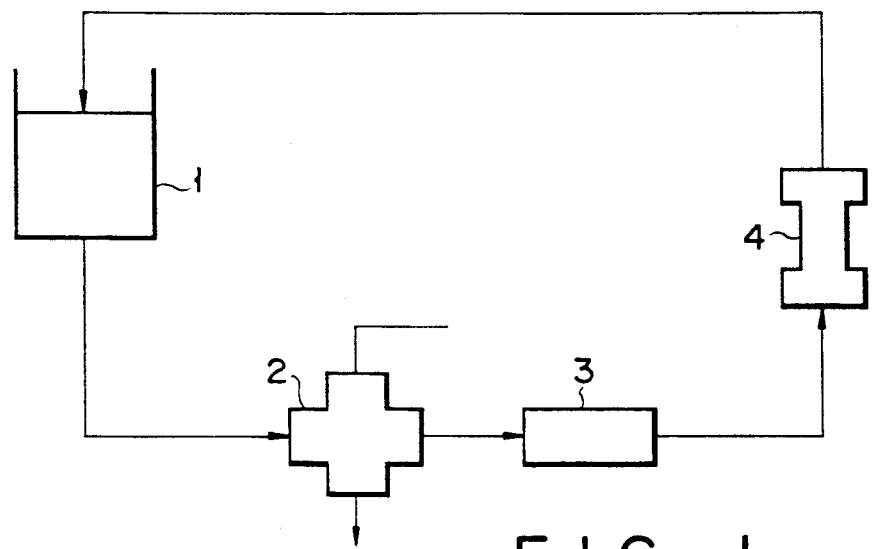
FIG. 1 is a schematic view of an apparatus for preparing composite materials in the form of ultra fine particles, which can be utilized in the method according to the present invention.

The method of preparing composite materials in the form of ultra fine particles of organic polymers, according to the present invention, comprises an impingement and crushing step wherein solid particles of organic polymer of at least two kinds, which are dispersed in a dispersion medium and which have different physical properties, are made to impinge with each other at high speed. By this method, the organic polymer particles are crushed and combined, or fused, at a fixed ratio, simultaneously to form composite materials in the form of ultra fine particles.

The ultra fine particles obtained by the impingement of the organic polymer particles are recognized to combine or fuse together due to mechanochemical reaction during the impingement period, and due to intermolecular interaction or molecule aggregate interaction (mainly electrostatic interaction at a level of the ultra fine particles).

The organic polymers utilized in the method of the present invention are, for example, polyethylene, polypropylene, polyphenylsulfite, polyimide, polymethyl methacrylate, polyester, or other thermoplastics. Thermoset resin can be also utilized as said organic polymers. In the preparation method of the present invention, a mixing ratio of the organic polymers of at least two kinds dispersed in a dispersion medium can be arbitrarily selected according to a composition ratio of the desired composite material in the form of ultra fine particles. When two kinds of organic polymers are used, it is desirable that the mixing ratio is 3:7 to 7:3 in view of practical use.

The dispersion medium utilized in the preparation method is, for example, aromatic solvent such as toluene, xylene, and benzene, ketones solvent such as methyl ethyl ketone and methyl isobutyl ketone, or alcohols solvent such as methyl alcohol, ethyl alcohol, and propyl alcohol. These solvents can be used, either singly or in combination. Alcohols solvents can be combined with water.

In order to cause the organic polymer particles dispersed in a dispersion medium, to impinge with one another at high speed, the particles are accelerated, for example, by pressurizing the dispersion medium to force out from a nozzle. The particles forced out need to have a speed high enough to impinge with each other and to be crushed. The pressure applied to the dispersion is preferably at least 50 kg/cm$^2$. When this pressure is 50 kg/cm$^2$, the speed of the particle is expected to be about 100 m/sec, depending on kinds of dispersion medium and kinds and mixing ratios of particles dispersed in the dispersion medium. The upper limit of the pressure is preferably 1500 kg/cm$^2$ for practical use. The upper limit of the speed of the particles is preferably about 600 m/sec.

Said impingement and crushing step is conducted, preferably at a temperature which is lower than a softening point of the organic polymers utilized. When the organic polymer particles are made to impinge with one another at a temperature higher than the softening point of the particles, the particles may possibly be adhered or aggregated by chemical reactions including thermal polymerization. This leads to efficiency reduction for formation of ultra fine particles.

In the method of the present invention, the impingement and crushing step is repeated until the composite materials in the form of ultra fine particles come to have a mean diameter of 0.1 μm at most. When the mean diameter is greater than 0.1 μm, it is difficult to combine or fuse organic polymers of at least two kinds at fixed ratio to form a composite material. The impingement and crushing step is repeated at least twice, preferably six times.

By the method of the present invention, composite materials in the form of ultra fine particles can be obtained which show improved physical properties that cannot be obtained for polymers of one kind. Moldings of organic polymers having improved physical properties can be obtained by, for example, forming a film from the composite materials in the form of ultra fine particles. The physical properties expected of the moldings of organic polymers are high tensile strength, high transparancy, and others. Also, composite materials in the form of ultra fine particles, obtained by the method according to the present invention, have a standardized molecule weight, because the molecular chains of organic polymers, specifically branched chains, are cut when the organic polymers impinge with one another at high speed. Therefore, moldings which suffer from fewer defects can be obtained by molding the composite materials. Moreover, since a composite materials manufactured by the method of the present invention have a particle diameter of at most 0.1 μm, ultra drawing is possible by rolling, which is impossible for particles obtained by the conventional method. Additionally, the ultra fine particles cause neither fish-eye nor contamination, when forming films. Films can thus be formed which are complete in molecular orientation and high in transparancy.

The method of preparing composite materials of organic polymers and inorganic compounds and/or metals, according to the present invention, comprises two impingement and crushing steps. In the first impingement and crushing step, solid particles of organic polymer of at least one kind dispersed in a dispersion medium impinge with one another at high speed. In the second impingement and crushing step, the ultra fine particles obtained by said first step impinge with inorganic compound particles and/or metal particles at high speed. In both impingement and crushing steps, the particles are crushed and combined, or fused, simultaneously, forming composite materials in the form of ultra fine particles comprising inorganic compounds and/or metals dispersed in organic polymer matrixes.

In the first impingement and crushing step, the same organic polymers and dispersion media can be utilized as those used in the method for preparing said composite material of the organic polymers in the form of ultra fine particles.

Also, in the first impingement and crushing step, the organic polymer particles dispersed in a dispersion medium can be accelerated by the same method as is used in the method of preparing composite materials of organic polymers in the form of ultra fine particles.

Moreover, the first impingement and crushing step is preferably conducted at a temperature which is at most softening point of the organic polymers utilized, in the same manner as in the method of preparing composite materials of organic polymers in the form of ultra fine particles.

The first impingement and crushing step is repeated at least twice, preferably at least six, as in the method of preparing composite materials of organic polymers in the form of ultra fine particles.

Inorganic compounds which can be arbitrarily utilized in the second impingement and crushing step are, for example, silicon resin, glass, various metal salts, oxide ceramics such as chromium oxide, alumina, and zirconia, nitride ceramics such as silicon nitride, aluminium nitride, and boron nitride, and carbide ceramics such as silicon carbide and boron carbide.

Also, in the second impingement and crushing step, any metal can be utilized, specifically, iron, silver, copper and their intermetallic compounds are practical and preferable.

An amount of inorganic compounds and/or metals to be dispersed in the dispersion in which the composite material in the form of ultra fine particles obtained in the first impingement and crushing step was dispersed can be arbitrarily selected according to a composition ratio of a desired composite material. A mixing ratio of inorganic compounds and/or metals to organic polymer matrixes is preferably 3:7 to 7:3, and is most preferably 5:5.

The inorganic compounds and/or metals utilized have a particle diameter of at most 10 μm. A diameter of at most 1 μm is preferable.

In order to make organic polymers in the form of ultra fine particles impinge against one another, and make inorganic compound particles and/or metal particles impinge against one another at high speed in the second impingement and crushing step, the dispersion medium containing the particles dispersed therein is accelerated, for example, by pressurizing and is forced out from a nozzle. The particles in the dispersion forced out need to have a speed high enough to impinge with each other and to be crushed. The pressure applied to the dispersion is preferably at least 50 kg/cm$^2$. When this pressure is 50 kg/cm$^2$, the speed of the particles is expected to be about 100 m/sec, depending on races of dispersion media and races and composition ratios of particles dispersed in the dispersion medium. The upper limit of the pressure is preferably 1500 kg/cm$^2$ for practical use. The upper limit of the speed of the particles is preferably 600 m/sec.

The second impingement and crushing step is preferably conducted at a temperature less than the softening point of the organic polymers utilized. When the organic polymer particles are made to impinge with each other at a temperature higher than the softening point of the particles, the organic polymer particles may possibly adhere or aggregate by chemical reactions including thermal polymerization. This leads to efficiency reduction for formation of ultra fine particles.

As has been stated, in the method of the present invention, the impingement and crushing step is repeated until the composite material in the form of ultra fine particles comes to have a mean diameter of at most 0.1 μm. When the mean diameter is greater than 0.1 μm, it is difficult to combine or fuse at least two organic polymers at fixed ratio to form a composite material. The second impingement and crushing step is repeated at least twice, preferably six times.

By implementing the second impingement and crushing step, composite materials in the form of ultra fine particles can be obtained which show improved physical properties due to the combination of organic polymers and inorganic compounds and/or metals. The film made of the obtained composite materials in the form of ultra fine particles can have the following improved properties:

i) The film comprises inorganic compounds and/or metals uniformly dispersed in organic polymer matrixes. The film has high tensile strength and other properties. For example, when a high voltage is applied to film comprising metal ultra fine particles uniformly dispersed in organic polymer matrixes, the film emits ultra fine metal particles, thus producing a porous membrane having a number of uniformly distributed holes.

ii) The film can be complete in molecular orientation and exhibit high barrier properties. This is because the composite material is in the form of ultra fine particles, and ultra drawing of the film can be conducted by rolling, which has been impossible for particles obtained from a conventional method.

iii) The film has high transparancy. This is because the composite material is in the form of ultra fine particles, and forming a film does not suffer from fish-eye and contamination.

iv) The film exhibits physical properties of the inorganic compounds and/or metals (for example, the film shows improved heat resistance). This is because the composite material is in the form of ultra fine particles, and the ratio of inorganic compounds and/or metals can be increased in comparison with that in a conventional composite material.

An apparatus which can be used for the method of the present invention will now be described.

FIG. 1 is a schematic view of a machine for preparing composite materials in the form of ultra fine particles by the methods of the present invention. As is shown in FIG. 1, a tank 1 is connected to a plunger pump 2 by piping. The pump 2 is connected to a filter 3 by piping. The filter 3 is connected to a impingement and crushing mechanism 4 by piping. The mechanism 4 is connected to the tank 1 by piping. A dispersion containing particles is accumulated in the tank 1. The dispersion in the tank 1 is pressurized by the plunger pump 2. The pressurized dispersion is passed through the filter 3. The filter 3 removes impurities and particles, which are large in diameter, from the dispersion. The filtered dispersion is subjected to impingement and crushing in the impingement and crushing mechanism 4. The dispersion containing ultra fine particles is supplied from the mechanism 4 to the tank 1.

Figure 2:
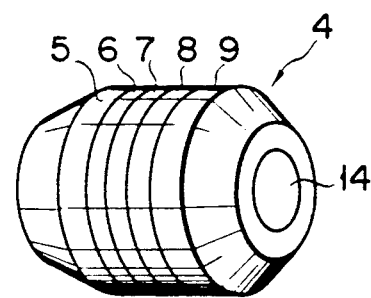
FIG. 2 is a perspective view schematically showing impingement and crushing mechanism as shown in FIG. 1.
Figure 3:
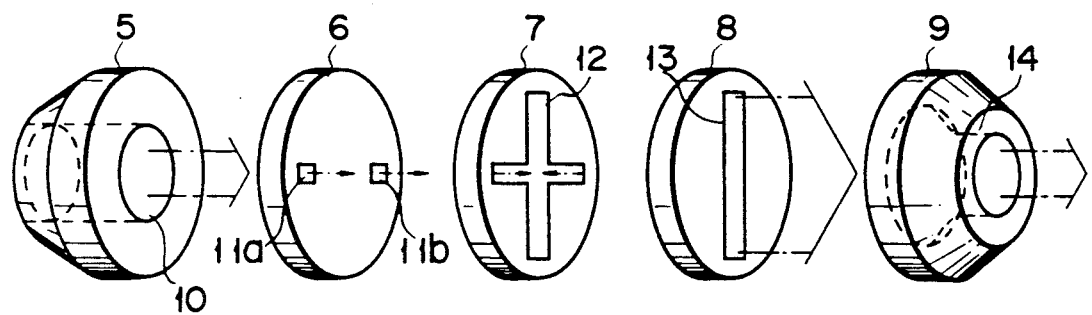
FIG. 3 is a perspective, exploded view of the impingement and crushing mechanism shown in FIG. 2.

FIG. 2 is a perspective view of the impingement and crushing mechanism 4. FIG. 3 is a exploded view of the mechanism 4 which is assembled. As shown in FIGS. 2 and 3, the mechanism 4 comprises a inflow block 5 shaped like a tapered rod, a pressure control disk 6, a impingement and crushing disk 7, an energy emitting disk 8, and a shaft taper outflowing block 9—all fastened together. The center portion of said inflowing block 5 has a inflowing hole 10 for supplying a dispersion to the pressure control disk 6. The pressure control disk 6 has, for example, two square holes 11a and 11b of a side-length of 140 μm, which are diametrically opposed and formed on the circumference of the disk 6. The impingement and crushing disk 7 has, for example, a cross-shape hole 12 having a width of 140 μm. The energy emitting disk 8 has, for example, a slit 13 having a width of 140 μm, and extending at right angles to the line in which square holes 11a and 11b are aligned. The outflowing block 9 has an outflowing hole 14 for the passage of the dispersion. The tank 1, the plunger pump 2, the filter 3, the impingement and crushing mechanism 4, and the pipings for connecting the other components are cooled by a cooling mechanism (not shown).

In the impingement and crushing mechanism 4, the applied dispersion is firstly passed through the inflowing block 5 as shown in FIGS. 2 and 3, and is accelerated while passing through the fine square holes 11a and 11b of the pressure control disk 6. Next, the direction of the dispersion is changed by the cross-shaped hole 12 of the next impingement and crushing disk 7. Here, the particles dispersed in the dispersion impinge with each other at the center of the hole 12, and are crushed to form ultra fine particles. The dispersion containing the ultra fine particles is further passed through the slit 13 of the next energy emitting disk 8. Then, the dispersion is discharged from the outflowing hole 14 of the next outflowing block 9 and finally returned to said tank 1. In the following examples of the present invention, NANOMIZER ® (Aturyuu Kougyou K. K.) was used as the above described apparatus. A pressure control disk 6, a impingement and crushing disk 7, and an energy emitting disk 8 of this machine used in examples of the present invention have diamond layers formed on its surface. The diamond layers prevent elements 6, 7 and 8 from abrasion.

EXAMPLE 1

First, 60 g of polypropylene (abbreviated hereinafter PP) particles which are 9 in melt index (M.I), 0.90 g/cc in density, and at most 60 $\mu$m in particle diameter, 40 g of polyethylene (abbreviated hereinafter PE) particles which are 2 in M.I. 0.93 g/cc in density, and at most 60 $\mu$m in particle 20 diameter, and 150 g of toluene were premixed by a homogenizer, thus preparing a dispersion. The dispersion was transferred to the tank 1 shown in FIG. 1. Next, the dispersion in the tank 1 was pressurized under 400 kg/cm² by means of the plunger pump 2, filtered by the filter 3, and supplied to the impingement an crushing mechanism 4. The circulating operation of impingement and crushing was repeated ten times, for about five minutes. In the circulating operation, the dispersion was cooled by a cooling mechanism (not shown), maintaining the dispersion at 10° C. which is less than the softening point of both PP and PE.

The dispersion obtained by said operation was a milk-white colloidal solution comprising a composite material of said dispersed organic polymers of two kinds in the form of ultra fine particles. Moreover, the composite material in the form of ultra fine particles was found to be at most 0.1 $\mu$m in average particle diameter by means of ultramicroscope measurement.

EXAMPLE 2

First, 80 g of PP particles which is the same as that in the example 1 and 150 cc of toluenemethylethylketone mixture solvent (mixture ratio 1:1) was premixed by a homogenizer to prepare a dispersion. The dispersion was transferred to the tank 1 shown in FIG. 1 at a room temperature. Next, the dispersion in the tank 1 was pressurized under 450 kg/cm² by means of the plunger pump 2 and transferred to the impingement and crushing mechanism 4 through the filter 3. In the impingement and crushing mechanism 4, PP particles were impinged and crushed, and then the dispersion outflowed from the impingement and crushing mechanism 4 was returned to said tank 1. This operation of impingement and crushing was repeated ten times in total for five minutes. The circulating operation was implemented with a cooling mechanism (not shown) so that the liquid mixture may be kept at a temperature which is less than a softening point of said PP.

Next, to the dispersion of PP particles in the form of ultra fine particles obtained by said impingement and crushing operation, 40 g of silica (SiO$_2$) particles wherein primary particles of 1 $\mu$m particle diameter aggregated, forming secondary particles of 10 $\mu$m average diameter, was added, and the resultant liquid was premixed thereby preparing a dispersion. This dispersion was transferred to the tank 1 at a room temperature. Next, the dispersion was pressurized in the tank 1 under 450 kg/cm² by means of the plunger pump 2, and was transferred to the impingement and crushing mechanism 4 through the filter 3. In mechanism 4, PP particles and silica particles were made to impinge and were crushed. The dispersion from mechanism 4 was finally returned to said tank 1. This impingement and crushing operation was repeated ten times, for five minutes. During this operation, the liquid mixture was kept at 10° C. which is less than a softening point of said PP.

The dispersion obtained by said operation was a milk-white colloidal solution wherein a composite material of said two substances in the form of ultra fine particles were dispersed. This composite material in the form of ultra fine particles had a mean diameter of less than 0.1 $\mu$m, as was determined by means of an ultramicroscope.

EXAMPLE 3

100 g of PE particles which are same as that in the Example 1, and 150 cc of a mixture solution of ethylalcohol and water were premixed by a homogenizer to prepare a dispersion. This dispersion was transferred to the tank 1 (FIG. 1) at a room temperature. Next, the dispersion in the tank 1 was pressurized under 700 kg/cm² by means of the plunger pump 2, filtered by the filter 3, and supplied to the impingement and crushing mechanism 4. In the mechanism 4, PE particles were made to impinge and was crushed. Next, the dispersion discharged from the mechanism 4 was transferred to the tank 1. This circulating operation of impingement and crushing was repeated 15 times, for about 8 minutes. In this circulating operation, the dispersion was cooled by a cooling mechanism (not shown), so that the dispersion was kept at 10° C. which is less than a softening point of said PE.

Next, to the dispersion of PE in the form of ultra fine particles, 30 g of chromium oxide particles wherein primary particles having a diameter of 0.5 $\mu$m, forming secondary particles having an average diameter of 5 $\mu$m, was added and premixed by a homogenizer, thereby preparing a dispersion. This dispersion was transferred to the tank 1 (FIG. 1) at room temperature. Next, the dispersion was pressurized in said tank 1 under 700 kg/cm² by means of the plunger pump 2 and transferred to the impingement and crushing mechanism 4 through the filter 3. In the mechanism 4, the PE particles and chromium oxide particles were made to impinge and were crushed. Then, the dispersion discharged from the mechanism 4 was transferred to said tank 1. This circulating operation of impingement and crushing was repeated 15 times, for 8 minutes. In this circulating operation, the dispersion was cooled by a cooling mechanism (not shown), so that the dispersion was kept at 10° C. which is less than said softening point of PE.

Figure 4:
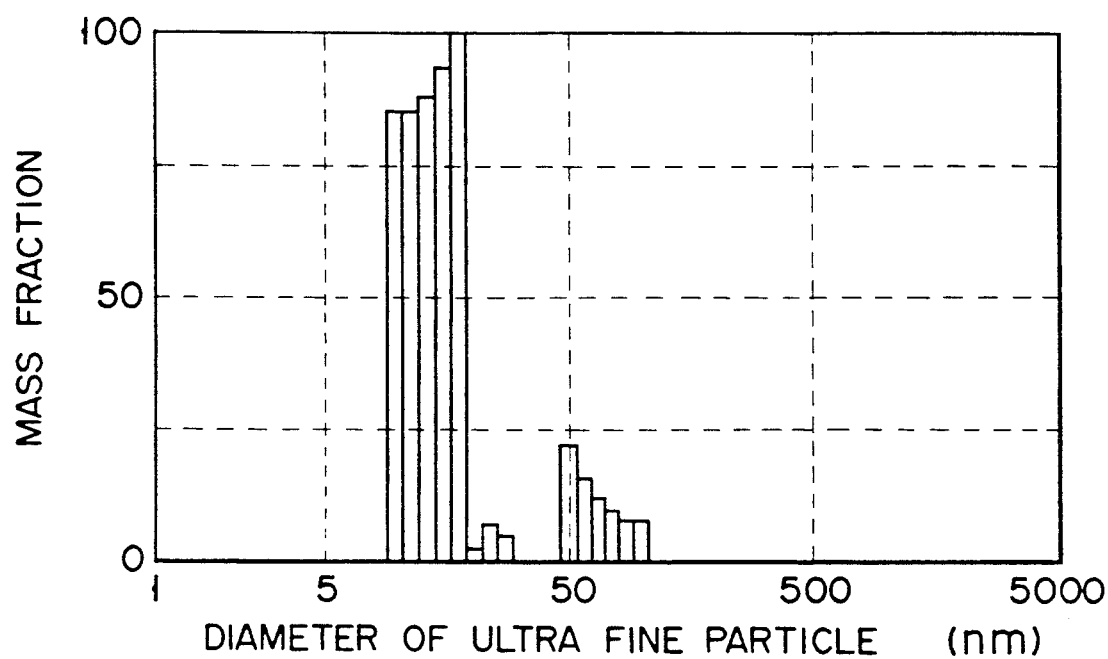
FIG. 4 is a graph showing particle size profiles of a composite material in the form of ultra fine particles manufactured by Example 3 of the present invention.

The dispersion thus obtained was a milk-white colloidal solution wherein a composite material in the form of ultra fine particles comprised of said two substances is dispersed. The particle diameter of the composite material in the form of ultra fine particles was measured by Brownian movement method utilizing B1-90 (Brook-Heaven) as a measuring apparatus. The measuring apparatus uses a laser beam. The diameter measured was 0.02 μm at most, as shown in particle size profiles in FIG. 4. In FIG. 4, the X axis shows particle diameter in nanometer, and the Y axis shows mass fraction. Mass fraction represents the number of particles which is given as a percentage of the number of particles having the most common diameter. In this case, the number of particles having the most common diameter is regarded as 100.

EXAMPLE 4

First, 40 g of PP particles and 40 g of PE particles, both being the same as those used in the Example 1, were added to 150 cc of toluene, all components were premixed by a homogenizer, thus preparing a dispersion. This dispersion was transferred to the tank 1 (FIG. 1) at room temperature. Next, the dispersion was pressurized in said tank 1 under 500 kg/cm$^2$ by the plunger pump 2, and transferred to the impingement and crushing mechanism 4 through the filter 3. In the mechanism 4, PP particles and PE particles were made to impinge and were crushed. Next, the dispersion discharged from the mechanism 4 was returned to the tank 1. The circulating operation of impingement and crushing was repeated 20 times, for about 12 minutes. In this circulating operation, the dispersion was cooled by a cooling mechanism (not shown), so that the dispersion was kept at 10° C. which is less than a softening point of said PP and PE.

Next, to the dispersion thus obtained, wherein PP and PE are in the form of ultra fine particles, 20 g of silica particles wherein primary particles of 1 μm diameter aggregated, forming secondary particles of 10 μm average particle diameter, and 20 g of iron particles having an average particle diameter of 10 μm, were added. The resultant liquid substance was premixed by a homogenizer, thus preparing a dispersion. This dispersion was transferred to the tank 1 shown in FIG. 1 at room temperature. The resultant liquid was pressurized in said tank 1 under 500 kg/cm$^2$ by means of the plunger pump 2, and was supplied to the impingement and crushing mechanism 4 through the filter 3. In the mechanism 4, PP particles, PE particles, silica particles and iron particles were made to impinge. Next, the dispersion discharged from the mechanism 4 was returned to said tank 1. This circulating operation of impingement and crushing was repeated 20 times, for about 12 minutes. In this circulating operation, the dispersion was cooled by a cooling mechanism (not shown), so that the dispersion was kept at 10° C. which is less than softening point of said PP and PE.

Figure 5:
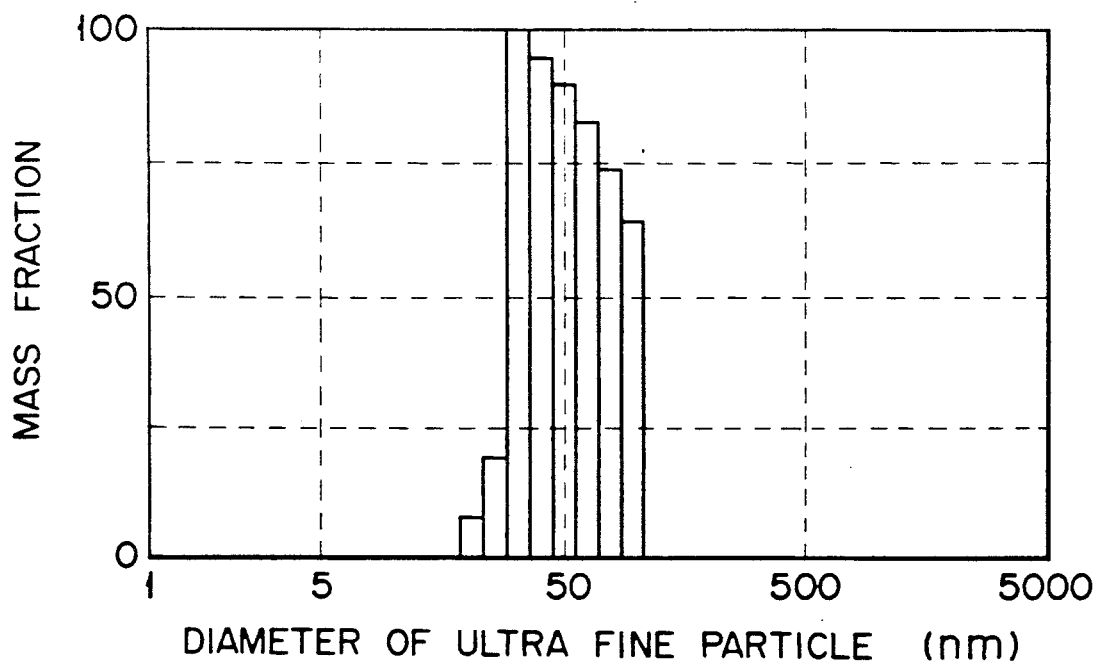
FIG. 5 is a graph showing particle size profiles of a composite material in the form of ultra fine particles manufactured by Example 4 of the present invention.

The dispersion thus obtained was a milk-white colloidal solution wherein a composite material in the form of ultra fine particles comprised of said four substances was dispersed. Moreover, the particle diameter of the composite material in the form of ultra fine particles was measured to be at most 0.06 μm, by Brownian movement method utilizing B1-90 (Brook-Heaven) as a measuring apparatus. The measuring apparatus uses laser beams. The results are shown in particle size profiles as shown in FIG. 5. In FIG. 5, the X axis shows a particle diameter in nanometer, and the Y axis shows mass fraction.

Mass fraction represents the number of particles which is given as a percentage of the number of particles having the most common diameter. In this case, the number of particles having the most common diameter is regarded as 100.

Next, the composite materials in the form of ultra fine particles obtained by the examples 1-4 where processed forming film having a thickness of about 10 μm. The tensile strength of the film of each example was measured. The results were as is shown in Table 1. In forming film made of the composite materials in the form of ultra fine particles obtained by the examples 1, 2 and 4, utilizing toluene as a dispersion medium, each composite material was simply dripped onto aluminium foil and casted to evaporate toluene. Also, in forming the film from the composite material in the form of ultra fine particles obtained by Example 3, utilizing ethyl alcohol as a dispersion medium, the following procedures were implemented. First, the composite material was dripped onto the aluminium foil, and the aluminium foil was mounted on a heated lower press to evaporate the medium. Next, the aluminium foil was inserted between an upper press and said lower press both heated to 170° C., thereby deaerating the foil for one minute. After that, the foil was pressurized under 50 kg/cm$^2$ by means of the upper and the lower presses and left to stand for 30 seconds. After pressurization, the pressed composite material together with the aluminium foil was transferred to a cooling press at 30° C. for molding.

Table 1 also shows reference examples 1 and 2 showing tensile strength of films made from PP and PE having said physical properties. These films were prepared in the following manner. PP and PE were respectively dissolved in paraxygene at 130° C. From each resultant solution, films were prepared by the same method as using in the case of example 3.

TABLE 1

|  | Materials of Film | Tensile Strength (kg/cm$^2$) |
|---|---|---|
| Example 1 | PP, PE | 450 |
| Example 2 | PP, Silica | 485 |
| Example 3 | PE, Chromium Oxide | 387 |
| Example 4 | PP, PE, Silica, Iron | 488 |
| Reference Example 1 | PP | 200 |
| Reference Example 2 | PE | 100 |

As is evident from Table 1, the films formed from the composite materials obtained in Examples 1, 2, and 4 showed greater tensile strength than the films made from polypropylene or polyethylene only. In Example 3, a composite material can be produced from polyethylene and chromium oxide. A similar conventional composite material made of polyethylene and chromium oxide is fragile, and to form film from this composite material is almost impossible. The film formed from the composite material obtained by Example 3 successfully showed greater tensile strength than that made from a conventional composite material of PP or PE only.

What is claimed is:

1. A method of preparing a composite material comprising at least two different kinds of organic polymers in the form of an intimate blend of ultra fine particles having an average particle diameter of at most 0.1 micron, said method comprising the steps of:
    (a) providing a liquid dispersion of particles in which at least two different kinds of organic polymers, having different physical properties, are dispersed; and (b) forcing the organic polymer particles dispersed in the liquid dispersion through a high speed particle impingement means under pressure sufficient to cause the particles to accelerate and impinge with each other at least twice at a speed sufficient to crush each organic polymer particle into particles smaller than those of the dispersion of step (a) and continuing the impingement and crushing until the resulting ultra fine particles have been reduced to an average particle diameter of at most 0.1 micron, and thereafter fusing together the smaller particles to form a composite material comprising an intimate blend of ultra fine particles of the polymers.

2. A method according to claim 1, wherein the impingement and crushing step is implemented at a temperature lower than a softening point of the organic polymers.

3. A method according to claim 1, wherein the dispersed particles are made to impinge with each other at least 6 times.

4. A method according to claim 1, wherein the organic polymers are accelerated by pressurizing and transferring the dispersion under at least 50 kg/cm$^2$ in the impingement and crushing step.

5. A method of preparing a composite material comprising at least one organic polymer in the form of an intimate blend of ultra fine particles having an average particle diameter of at most 0.1 micron, said method comprising the steps of:

(a) providing a first liquid dispersion in which particles of at least one organic polymer are dispersed;

(b) forcing the organic polymer particles dispersed in the first liquid dispersion through a high speed particle impingement means under pressure sufficient to cause the particles to accelerate and impinge with each other at least twice at a speed sufficient to crush each organic polymer particle into particles smaller than those of the dispersion of step (a) and continuing the first impingement and crushing until the resulting ultra fine particles have been reduced to an average particle diameter of at most 0.1 micron, (c) providing a second liquid dispersion in which inorganic compounds, metal particles, or both, are dispersed; and (d) forcing the particles dispersed in the second dispersion through a high speed particle impingement means under pressure sufficient to cause the particles to accelerate and impinge with each other at least twice at a speed sufficient to crush each particle into particles smaller than those of the dispersion of step (c) until the ultra fine particles have been reduced to an average particle diameter of at most 0.1 micron, and thereafter fusing together the smaller particles of steps (b) and (d) to form a composite material comprising an intimate blend of ultra fine particles of the at least one organic polymer and the metal or inorganic particles.

6. A method according to claim 5, wherein the first and second impingement and crushing steps are performed at a temperature lower than a softening point of the organic polymer.

7. A method according to claim 5, wherein said dispersed particles are made to impinge with each other at least six times in the first and second impingement and crushing steps.

8. A method according to claim 5, wherein the particles dispersed in the dispersion are accelerated by pressuring and transferring the dispersion under at least 50 kg/cm$^2$ in the first and second impingement and crushing steps.

* * * * *